Aug. 6, 1940.     O. WEIGNER     2,210,645
AUTOMATIC ARC WELDING
Filed Nov. 9, 1937     2 Sheets-Sheet 1
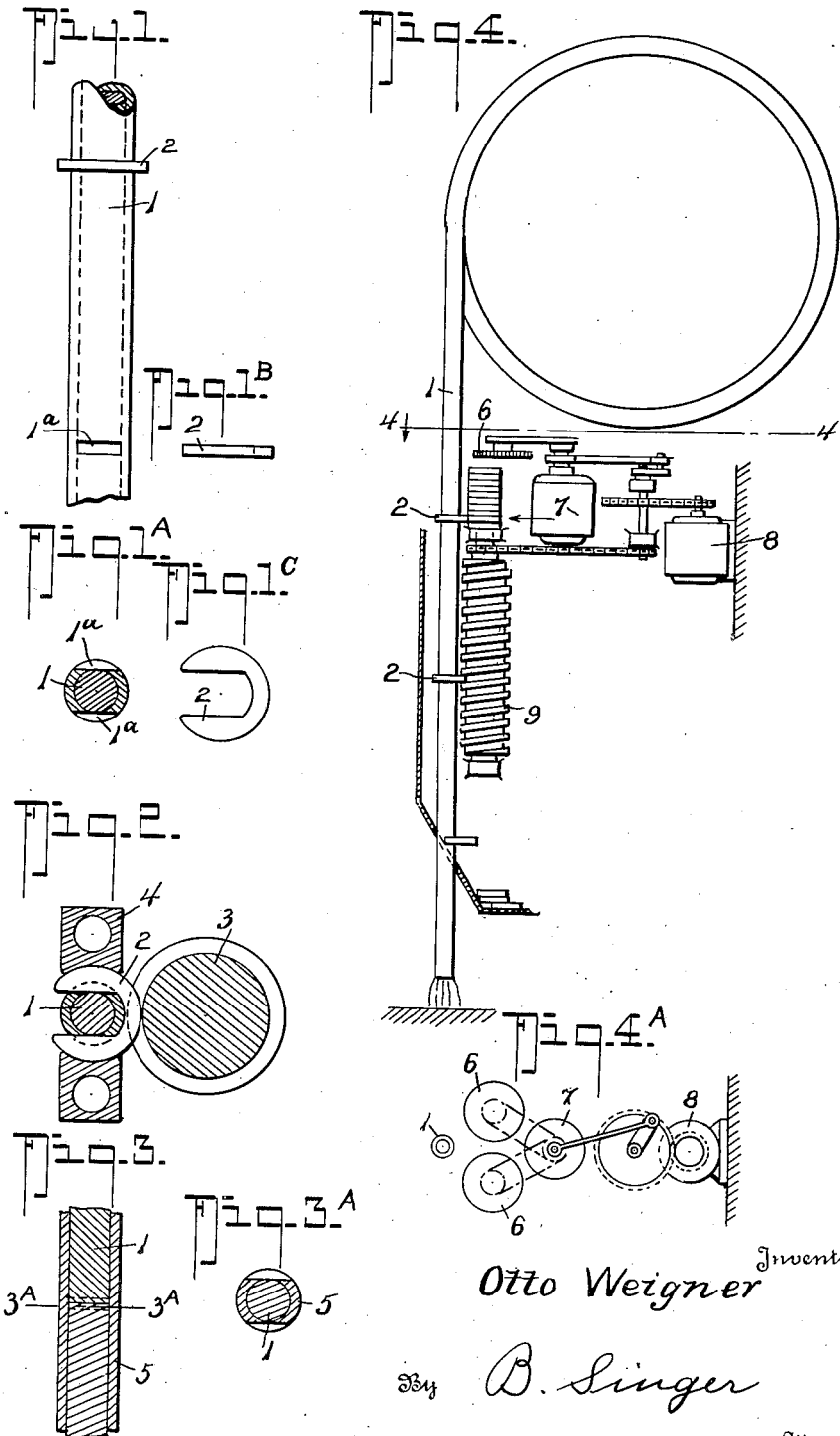
Otto Weigner, Inventor
By B. Singer, Attorney Aug. 6, 1940.　　　　O. WEIGNER　　　　2,210,645
AUTOMATIC ARC WELDING
Filed Nov. 9, 1937　　　2 Sheets-Sheet 2
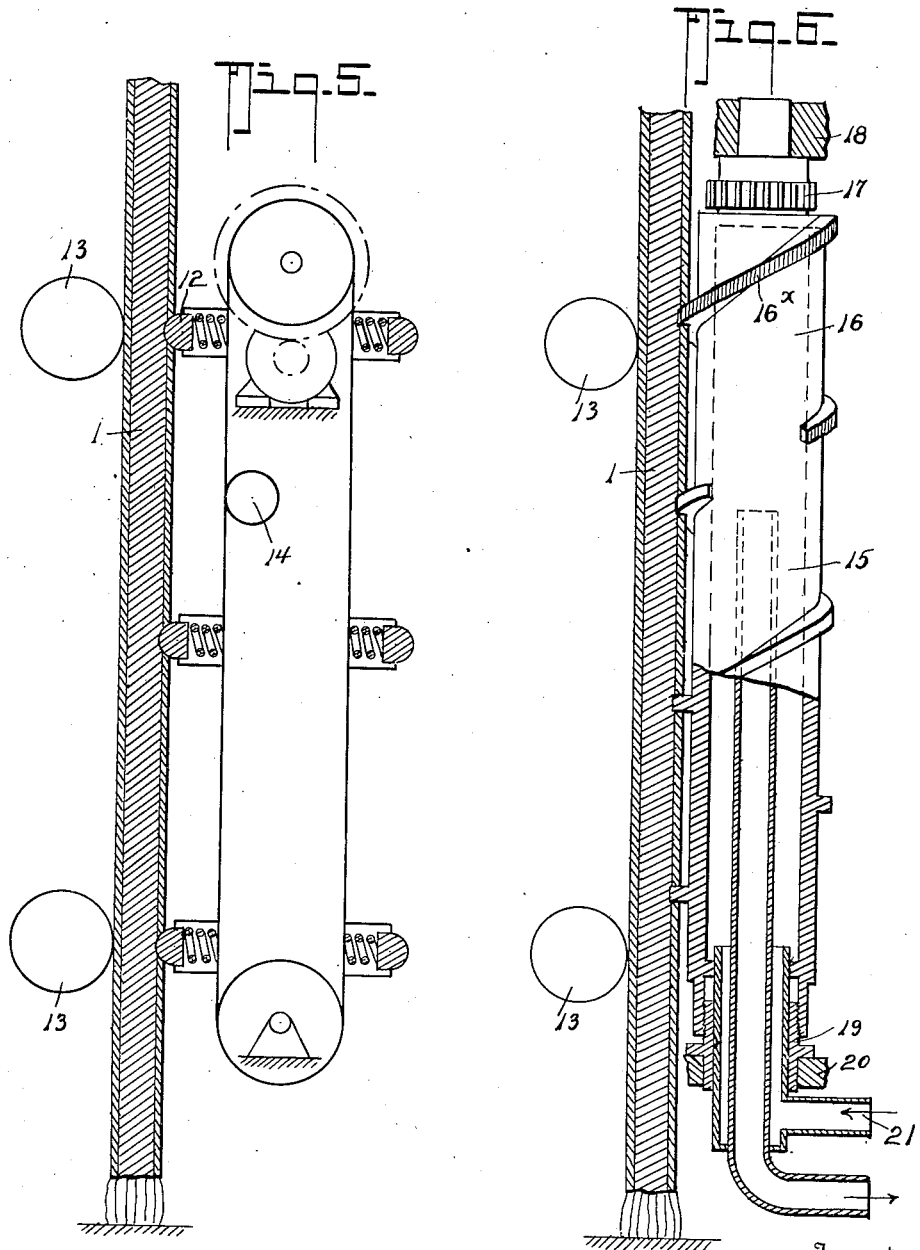
Inventor
Otto Weigner
By B. Singer
Attorney Patented Aug. 6, 1940

2,210,645

UNITED STATES PATENT OFFICE

2,210,645

AUTOMATIC ARC WELDING

Otto Weigner, Vienna, Austria, assignor to Elin A. G. für elektrische Industrie, Vienna-Weiz, (Styria) Austria, a corporation of Austria Application November 9, 1937, Serial No. 173,617
In Austria November 14, 1936

12 Claims. (Cl. 219—8)

This invention relates to the feeding of electric current and the transmission of the advancing movement to covered electrodes used in automatic welding. It is known to feed the welding current to rigidly and current-conductively interconnected covered electrodes only at spaced bared points on the electrodes, either by means of pins joining the electrodes or by means of metal chaplets (plates) clamped between each electrode and the next. For this purpose the advancing of the electrodes is effected either by means of an endless band or by means of a screw threaded spindle in which the pins or chaplets engage, the drive of the advancing mechanism being controlled automatically in dependence on the voltage of the electric arc.

For the mechanical and electrical interconnecting of the covered electrodes various methods, such as screwing together, fitting together, or welding together, have been proposed.

The increasing of the admissible current load makes it desirable to bring the points at which current is fed to the electrodes nearer together than corresponds to the usual length of welding electrodes, viz., 350–450 mm. It is also desirable to be able to use endless covered electrodes, of the type supplied in rings, in automatic electric arc welding.

It is already known to enable endless electrodes to be used in automatic welding by removing some of the covering continuously in an axial direction down the length of the electrode by means of a milling cutter in the welding head, and feeding the current to the bared track thus obtained, with the aid of brushes. Apart from the inevitable damage of a serious nature done to the crumbly covering composition and the covering of all the parts of the welding head with dust resulting from this method the combining of current feed and electrode advancing is not feasible, and the wear on the brushes is very heavy. Moreover, in the case of thin coated electrodes this method of effecting the feed causes an appreciable part of the covering to go to waste with the result that the quality of the welding seam is not as good as it otherwise would be.

A further prior proposal, according to which rollers with a cutting edge and mounted on a wheel are pressed into the covering and in this manner the feeding of current to the electrode and the advancing of the electrode effected in one operation, has not proved satisfactory in practice either. Owing to the hardness of the generally crystalline covering composition the cutting edges wear away very rapidly, and even when the edges are new particles of the covering composition become lodged between the cutting edges and the electrode core, which is detrimental to the proper transmission of current to the electrode, causes the cutting edges to heat, and in view of the high current strengths of several hundred amperes used contributes still further to the destruction of the sharp edges.

According to the present invention the known arrangement referred to at the outset is improved upon, the spacing of the points of contact for the current feed rendered independent of the length of the electrodes, and the welding with endless covered electrodes facilitated, by providing bared spots in the covering extending in as far as up to the electrode core and causing the simultaneous transmission of current and of the feed or advancing movement of the electrodes to be effected by means of elements which are neither involved in the production or forming of the bared spots nor restricted to the points of interconnection between the electrodes, the bared spots being equally spaced at a distance apart that may be determined at will.

The elements contemplated for this purpose are for instance slotted small metal plates or chaplets, drivers resiliently pressed on, or the turns of the thread on a screw spindle, all these elements being capable of being brought temporarily and repeatedly into close and perfect electric contact with the core of the electrode, but not having to enter the welding zone and be welded along with the material of the electrode.

There thus results, of necessity, an improvement in the quality of the weld, as compared with that obtained by the previously known method on which the present invention provides an improvement, since in the first place the risk of flaws in the seam due to the welding in of the driving chaplet (plates), which is after all of considerable size compared with the cross-sectional area of the electrode core, is eliminated, while in the second place the possibility is also provided of welding with a lower current strength than would be necessary for welding in the driving chaplet (plates), which in its turn makes it possible for the first time for small section electrodes to be used in automatic welding.

The baring of spaced portions of the surface of the electrode core may be effected in the course of the manufacturing of the electrodes, or alternatively may be carried out prior to the introduction of the electrodes into the automatic welding machine by the formation of longitudinal or peripheral slots through the covering, or again during the welding operation by means of a milling or cutting device attached to the automatic welding machine, for which purpose this attachment takes its drive positively from the drive of the advancing mechanism and is brought up to the electrode at stated intervals.

To enable slotted current-feeding and electrode-driving chaplets (plates) to be used the electrode is preferably bared at two opposite points on its periphery, while for use with current-conducting driving elements of other than slotted shape it may suffice to bare the electrode core by cutting away the covering at intervals on one side only.

The slotted driving chaplets (plates) are preferably arranged on the one hand to brush between current conducting bars which are as a rule water-cooled, and on the other hand to engage in a feed or advancing device which may be of conventional design.

The detaching of the slotted chaplets (plates) after clearing the advancing mechanism and the current feed bars is effected by suitable wiping or ejecting means which may be coupled with a device for inserting the chaplets (plates) from a supply stack, and that in such a manner during the advancing of the electrodes that at least one chaplet (plate) at a time touches the current conducting bars and engages in the advancing mechanism. Both the current feed and the advancing of the electrode are thus free of interruption throughout the entire welding operation. Instead of or in addition to the baring slots in the electrode covering, the described driving and current-conducting chaplet (plate) may of course also be applied to current-conducting connecting pieces used to join the electrodes together end to end. In this case short end portions of the covered electrodes are bared by cutting or grinding and joined together by the connecting sleeves. The sleeves themselves are furnished with the slots required for the engagement of the driving and current-conducting elements.

If elastic driving elements are employed as current-conducting members, which are pressed up against bared portions of the covered electrode and thus positively ensure close contact and reliable advancing of the electrode, there are preferably provided counter-supporting rollers to save the electrode from becoming bent, or alternatively there are used two endless bands with sprung driving elements as current-conducting members which press against the electrode from opposite sides so that the effects of the spring pressing-up means cancel each other.

The threaded spindle, which in accordance with the present invention engages directly, without the intermediary of engaging elements such as small plates on the electrode, in the consecutive bared places in the electrode, so as to serve when rotated both for advancing the electrode and also for feeding the current thereto, is preferably made hollow, and water-cooled, from some metal, such as a copper alloy, which is a good conductor of electricity. By providing, above the current feeding spindle, a spindle made of tool steel and having serrated screw threading of the same pitch as the conductor spindle, and rotating this spindle with the former the cutting of the required slots in the covering at the proper intervals may be effected in a simple manner.

Constructional examples are given, by way of illustrating the invention, in the accompanying drawings.

Fig. 1 is a detail side elevation of a covered electrode having diametrically disposed slots at intervals, one being shown with a slotted plate in position and another being shown without the slotted plate.

Fig. 1$^A$ is a horizontal section through the electrode at one of the slotted areas.

Fig. 1$^B$ is an edge view of one of the slotted plates.

Fig. 1$^C$ is a top plan view of the slotted plate.

Fig. 2 is a detail horizontal section showing the electrode, the feed screw, the current supply bars in section and a slotted plate in plan; this figure shows the co-relation of the parts mentioned, in their operative positions.

Fig. 3 is a detail vertical section of the ends of two electrodes with a joining sleeve or ferrule.

Fig. 3$^A$ is a cross section on the line 3$^A$—3$^A$ of Fig. 3.

Fig. 4 is a diagrammatic side elevation of the apparatus employing the parts such as are shown in the preceding figures.

Fig. 4$^A$ is a diagrammatic detail plan on the line 4$^A$—4$^A$ of Fig. 4.

Fig. 5 is a diagrammatic side elevation and part section of a modification.

Fig. 6 is a view similar to Fig. 5 of a further modification.

Referring to Figs. 1 and 2 of these drawings, the electrode 1 is provided with bared recesses or gaps 1$a$ in which there engage the slotted chaplets (plates) 2 which in their turn are connected both with the screw threaded spindle 3 for transmitting the advancing movement and also with current supply bars 4.

In the form shown in Fig. 3 the joining sleeve or ferrule 5 is utilized for current conducting and the transmission of advancing movement, it being advisable to provide, in addition to this one engaging point, further engaging points spaced like these shown in Fig. 1. Figs. 4 and 4$^A$ illustrate welding with endless electrodes 1 with the aid of these slotted chaplets (plates) 2, the automatic cutting device taking its drive from the spindle 3, as also the means for inserting and detaching the driving chaplets. A feed motor 8 drives the screw threaded spindle 9 through the intermediary of countershaft gearing. At the same time, through the instrumentality of crank gear, the motor 8 moves the cutting motor 7 and with it the two cutters 6 alternately towards and away from the electrode. In this manner cuts are made in the covered electrode at any desired intervals depending on the adjustment of the crank gear.

Fig. 5 shows a form of construction embodying the use of resiliently pressed up driving elements secured, in uniformly spaced relation, on a band, chain, wire cord, or the like.

Fig. 6 shows the use of a screw-threaded spindle 15 for advancing and feeding current to the electrode, and having a screw-threaded element 16 having its thread provided with cutting edges 16$^x$ for the production of the bared places. The feeding spindle 15 is supported by the bearings 18 and 20, which bearings may also serve for supplying the current. Driving is effected by any suitable motor (not illustrated) acting by means of suitable gearing on the toothed wheel 17 of the spindle. The element 16 preferably consists of hardened tool steel. The tubular system 21 leads through the stuffing box 19 into the hollow interior of the spindle 15 and provides for the flowing in and off of the cooling water. Also here the electrode is supported by counter rollers 13.

In Figs. 5 and 6 of the drawings there are shown counter-supporting rollers 13 which are provided for the purpose of preventing the electrode from becoming bent or buckled by pressure exerted thereon from one side only.

Having now particularly described and ascertained the nature of my said invention and in what manner the same is to be performed, I declare that what I claim is:

1. In electric welding apparatus using a covered electrode, a welding head, a cutting device in said welding head for the production of bared places on the electrode, said places being spaced irrespectively of the length of the electrode, said cutting device having cutters rotating in planes crossing the longitudinal axis of the electrode so as to obtain bared places of comparatively small longitudinal extension and moving means mechanically coupled with said cutting device and automatically coming into electrical contact with said bared places, said means providing simultaneously for feeding current to as well as for advancing the electrode.

2. In electric welding apparatus using rod-shaped electrodes, a welding head, means for the rigid and current-conducting interconnection of the said electrodes, current-leading elements conductively and positively mechanically connected to the core of the said electrodes, at previously bared places spaced irrespectively of the length of the electrodes, electric conductors extending parallel to the said electrodes for a distance greater than the clearance between any consecutive two of the said elements, means for securing electrical contact between the said conductors and the said elements, means for feeding forward the said elements, and means in the said welding head for producing the said bared places on the electrodes, means to project and retract said last named means to place same in its operative and non-operative positions respectively, and a single motor for operating said projecting and retracting means and said electrode elements feeding means.

3. In electric welding apparatus using covered rod shaped electrodes, means for the rigid and current-conducting interconnection of the said electrodes, current-leading elements conductively and positively mechanically connected to the core of the said electrodes, at previously bared places spaced irrespectively of the length of the electrodes, electric conductors extending parallel to the said electrodes for a distance greater than the clearance between any consecutive two of the said elements, means for securing electrical contact between the said conductors and the said elements, means for advancing the said elements, and a cutting device comprising a rotary cutter, a motor to rotate said cutter, and driving means cooperative with said advancing means for bringing said cutting device to bear against said electrodes at intervals depending upon the rate of advancing said electrodes.

4. In electric welding apparatus using covered rod shaped electrodes, means for the rigid and current-conducting interconnection of the said electrodes, current-leading elements conductively and positively mechanically connected to the core of the said electrodes at previously bared places, spaced irrespectively of the length of the electrodes, electric conductors extending parallel to the said electrodes for a distance greater than the clearance between any consecutive two of the said elements, means for securing electrical contact between the said conductors and the said elements, means comprising a screw spindle for advancing the said elements and a cutting device, movable up to and away from the said electrodes comprising a rotary cutter, a motor for rotating said cutter gearing operatively coupled with said cutting device and with said screw spindle, and adapted to control the bringing up and withdrawing of the said cutter to and from the said electrodes at intervals depending on the rate of advancing said electrodes, the said spindle being disposed parallel to the said electrodes.

5. In electric welding apparatus using a covered electrode, a welding head, a cutting device in said welding head for the production of bared places on said electrode, said places being spaced irrespectively of the length of the electrode, said cutting device having cutters rotating in planes crossing the longitudinal axis of the electrode so as to obtain bared places of comparatively small longitudinal extension, means providing for feeding current to and advancing the electrode, said means comprising current-leading elements conductively and positively mechanically connected to the core of said electrode at the said bared places, electrical conductors extending parallel to the said electrode for a distance greater than the clearance between any consecutive two of the said elements, means for securing electrical contact between the said conductors and the said elements and means for feeding forward the said elements, means to project and retract said cutting means to place it in its operative and non-operative position, respectively, and a single motor for operating said projecting and retracting means and said last named feeding means.

6. In electric welding apparatus using covered rod-shaped electrodes having previously bared places spaced irrespectively of the length of the electrodes, means to secure electrical contact with said electrodes simultaneously at two or more spaced bared places and to advance said electrodes, said means comprising a screw spindle of good current-conducting material for current feeding and for advancing the electrode, the threads of the screw lying in said bared places, and means to hold said electrodes with the bared areas of their cores in contact with the threads of said screw spindle.

7. In electric welding apparatus using covered rod-shaped electrodes, having previously bared places spaced irrespectively of the length of the electrodes, means for applying current to the core of said electrodes for a distance along the electrodes greater than the space between any two bared places, said means including an endless mechanically controlled band, driving elements on said band, means resiliently urging said driving elements to press against the electrode cores in said bared places and counter-supporting means bearing against the electrodes on the side opposite said driving elements to safeguard the electrodes from becoming bent.

8. Means to feed and effect electrical connection with covered welding electrodes having longitudinally spaced apart bared places, said means comprising an endless current conducting belt having one of its flights paralleling the electrode, means to drive said belt, a series of cups secured to said belt at intervals corresponding to the distances between the bared places of the electrodes, spring pressed contact elements carried by said cups to engage the electrodes in the bared spaces, and counter guide means engaging the electrodes at places diametrically opposite said contact elements.

9. In an electric welding apparatus according to claim 5, means comprising a screw spindle for advancing the current-leading elements which are conductively and positively mechanically connected to the core of the electrode at the previously bared places, said screw spindle being disposed parallel to the said electrode.

10. In an electric welding apparatus according to claim 5, the use of chaplets as current leading elements, said chaplets being made of good current-conducting material and being slotted, and adapted to be fitted to the previously produced narrow bared places on the electrode and to engage in the driving elements of the advancing mechanism, preferably a screw-threaded spindle.

11. In an electric welding apparatus using a covered electrode, a welding head, a cutting device in said welding head for the production of bared places on the electrode, said places being spaced irrespectively of the length of the electrode, said cutting device having cutters rotating in planes crossing the longitudinal axis of the electrode so as to obtain bared places of comparatively small longitudinal extension and moving means providing simultaneously for feeding current to as well as for advancing the electrode, said means comprising a rotating screw-spindle of good current-conducting material mechanically coupled with said cutting device so that the threads of the screw-spindle will come into engagement with said bared places, and means to hold said electrode with the bared areas of its core in contact with the threads of said screw spindle.

12. In an electric welding apparatus using a covered electrode, a welding head, a cutting device in said welding head for the production of bared places on the electrode, said places being spaced irrespectively of the length of the electrode, said cutting device consisting of a rotating spindle disposed parallel to the said electrode and having a cutting screw threading, moving means providing simultaneously for feeding current to and for advancing the electrode, said means comprising a second screw spindle of good current-conductive material coupled with the said first screw spindle so that the threads of the second screw spindle will come into engagement with said bared places, and means to hold said electrode with the bared areas of its core in contact with the threads of the second screw spindle.

OTTO WEIGNER.